United States Patent [19]
Stevens et al.

[11] Patent Number: 6,107,374
[45] Date of Patent: Aug. 22, 2000

[54] ASPHALT MODIFIED WITH OLEFIN/ VINYLIDENE AROMATIC MONOMER INTERPOLYMERS

[75] Inventors: James C. Stevens, Richmond, Tex.; Francis J. Timmers; Arnold L. Gatzke, both of Midland, Mich.; Corwin J. Bredeweg, Midlamd, Mich.; Kevin W. McKay, White Bear Lake, Minn.; William A. Gros, Baton Rouge, La.; Charles F. Diehl, Lake Jackson, Tex.

[73] Assignee: The Dow Chemical Company, Midland, Mich.

[21] Appl. No.: 09/117,131

[22] PCT Filed: Jul. 10, 1997

[86] PCT No.: PCT/US97/12567

§ 371 Date: Jul. 23, 1998

§ 102(e) Date: Jul. 23, 1998

[87] PCT Pub. No.: WO98/22535

PCT Pub. Date: May 28, 1998

Related U.S. Application Data

[60] Continuation-in-part of application No. 08/469,828, Jun. 6, 1995, Pat. No. 5,703,187, which is a division of application No. 07/545,403, Jul. 3, 1990, which is a continuation-in-part of application No. 07/401,345, Aug. 31, 1989, abandoned.

[51] Int. Cl.[7] .................................................. C08L 95/00
[52] U.S. Cl. ................................. 524/60; 524/59; 524/71; 526/336; 526/339; 526/347
[58] Field of Search ................................. 524/59, 60, 71; 526/339, 340, 336, 347

[56] References Cited

U.S. PATENT DOCUMENTS

| | | | |
|---|---|---|---|
| 2,935,486 | 5/1960 | Sayko et al. | 524/60 X |
| 2,996,467 | 8/1961 | Hawley et al. | 524/60 |
| 4,145,322 | 3/1979 | Maldonado et al. | 260/28.5 |
| 4,240,946 | 12/1980 | Hemersam | 260/28.5 |
| 4,673,711 | 6/1987 | Sharps, Jr. et al. | 525/240 |
| 4,839,404 | 6/1989 | Chang et al. | 524/69 |
| 4,933,384 | 6/1990 | Wolfe | 524/69 |
| 4,975,476 | 12/1990 | Wolfe | 524/59 |
| 5,288,762 | 2/1994 | Park et al. | 521/79 |
| 5,302,638 | 4/1994 | Ho et al. | 524/59 |
| 5,340,840 | 8/1994 | Park et al. | 521/60 |
| 5,346,963 | 9/1994 | Hughes et al. | 525/285 |
| 5,460,818 | 10/1995 | Park et al. | 426/415 |
| 5,488,078 | 1/1996 | Shutt et al. | 524/71 |
| 5,703,187 | 12/1997 | Timmers | 526/282 |

FOREIGN PATENT DOCUMENTS

| | | | |
|---|---|---|---|
| 2097457 | 6/1993 | Canada | E04D 12/001 |
| 0 009 432 | 4/1980 | European Pat. Off. | |
| 0 338 336 | 10/1989 | European Pat. Off. | |
| 416815 A2 | 3/1991 | European Pat. Off. | C08F 10/00 |
| 572990 A2 | 12/1993 | European Pat. Off. | C08F 210/02 |
| 07/278230 | 10/1995 | Japan | C08F 210/02 |
| 95/32095 | 11/1995 | WIPO | B32B 27/32 |

OTHER PUBLICATIONS

"First Technical Details on Some Next–Generation Polyolefins", *Plastics Technology*, Sep. 1992, pp. 25.

Kurt W. Swogger, "Application of Insite* Technology in the Rubber/Elastomer Market", *Worldwide Metallocene Conference Metcon '95*, May 17–19, 1995, Houston, Texas.

"Dow pairs ethylene, styrene", *Plastics News*, Jun. 26, 1995, pp. ?.

"Metallocene Catalysts Initiate New Era In Polymer Synthesis", *Chemical & Engineering News*, Sep. 11, 1995, pp. 15–20.

Gerald Lancaster et al., "Applications of Insite* Technology in the Rubber/Elastomer Market", *Proceedings of Fifth International Business Forum on Specialty Polyolefins SPO '95*, Sep. 20–22, 1995, pp. 109–123.

"Dow Plots PP Course", *Chemical Week*, Strategies, Dec. 20/27, 1995, p. 8.

Y.W. Cheung et al. "Structure, Thermal Transitions and Mechanical Properties of Ethylene/Styrene Copolymers", *ANTEC '96*, pp. 1634.

C.P. Park et al., "Compatibilization of Polyethylene–Polystyrene Blends with Ethylene–Styrene random Copolymers", *ANTEC '96*, pp. 1887.

"Metallocene Technology Drives New Materials", News Update, *Canadian Plastics*, Jan. 1996, vol. 54, No. 1, pp. 8.

"Metallocene yield ethylene–styrene interpolymers", NEWSFOCUS, *Plastics Technology*, Jan. 1996, pp. 13.

"Dow's plan's for '96: Become force in PP", *Plastics World*, Jan. 1996, pp. 12–13.

Derwent Abstract 95–281168 (JP 07/179847, Dec. 22, 1993).

Derwent Abstract 97/325153/41 (CA 2,097,457)*.

"Material Properties and Applications of Ethylene–Styrene Interpolymers from Metallocene Catalyst", Steve Hoenig et al., *Proceedings of Sixth International Business Forum on Specialty Polyolefins SPO'96*, pp. 261–268.

International Search Report dated Dec. 16, 1997 issued by the EPO acting as the International Searching Authority in PCT/US97/12567.

*Primary Examiner*—Fred Teskin

[57] ABSTRACT

Bitumens can be blended with interpolymers prepared from least one olefin and at least one vinyl or vinylidene aromatic monomer and, optionally, at least one diene. The interpolymers prepared from monomers containing a diene are new compositions of matter. When the interpolymers prepared from monomers containing a diene are blended with a bitumen, the blends are crosslinkable.

13 Claims, No Drawings

ASPHALT MODIFIED WITH OLEFIN/ VINYLIDENE AROMATIC MONOMER INTERPOLYMERS

CROSS REFERENCE TO RELATED APPLICATIONS

This application is a national application of International Application No. PCT/US 97/12567 filed Jul. 10, 1997 and a CIP of U.S. application Ser. No. 08/754,658 filed Nov. 21, 1996 (now abandoned), which is a continuation-in-part of application Ser. No. 08/469,828 filed Jun. 6, 1995, (now U.S. Pat. No. 5,703,187) which is a division of application Ser. No. 07/545,403 ) filed Jul. 3, 1990, which is a continuation-in-part of application Ser. No. 07/401,345 filed Aug. 31, 1989 (now abandoned), all of which are incorporated herein by reference in their entirety.

BACKGROUND OF THE INVENTION

The present invention concerns blend compositions comprising asphalt or bitumen modified with interpolymers of olefins and vinylidene aromatic monomers applicable to paving, roofing and other construction materials containing these compositions, a process for preparing said compositions and the composition of the interpolymers used to make the blended compositions. The invention also concerns new substantially random interpolymers resulting from polymerizing at least one olefin, at least one vinylidene aromatic monomer and at least one diene.

The use of petroleum residuum such as asphalt as a paving material and other construction material is well known. It is also well known to blend various polymeric materials into the asphalt to improve certain properties. For example, polyolefins have been used; but, as pointed out in U.S. Pat. No. 4,240,946 the teachings of which are specifically incorporated herein by reference, the addition of such polyolefins increases the viscosity of such blends at working temperatures thus necessitating special mixing and homogenizing procedures. The use of such polyolefins, however, is greatly desired since they help maintain the integrity of the asphalt when subjected to elevated temperatures such as when used as paving, roofing or other construction material. It would be desirable if a material were discovered which when added to bitumen would broaden the applicable temperature range of bitumen, stiffening the bitumen at high temperatures while maintaining low temperature flexibility and usable viscosities. It would also be desirable if this additive would be stable to the high temperatures encountered during the blending with bitumen and long term storage of the blend.

It would be highly desirable if polymers were available which were compatible with a variety of asphalt compositions and it would further be desirable if these polymers were easily mixed into the asphalt with only low shear agitation.

BRIEF SUMMARY OF THE INVENTION

The present invention pertains to a composition comprising (A) from about 85 to about 99 percent by weight of a bituminous material; and (B) from about 1 to about 15 percent by weight of at least one interpolymer containing from about 20 to about 80 weight percent of polymer units derived from at least one vinylidene aromatic monomer and from about 20 to about 80 weight percent of polymer units derived from at least one aliphatic olefin having from 2 to about 10 carbon atoms.

Another aspect of the present invention pertains to a composition comprising (A)from about 90 to about 99 percent by weight of a bituminous material; and (B) from about 1 to about 10 percent by weight of an ethylene/styrene interpolymer containing from about 25 to about 60 percent by weight of polymer units derived from styrene and from about 40 to about 75 percent by weight of polymer units derived from ethylene.

Another aspect of the present invention pertains to an aqueous dispersion or emulsion comprising
  (A) from about 90 to about 99 percent by weight of bituminous material; and
  (B) from about 1 to about 10 percent by weight of at least one interpolymer containing from about 20 to about 80 weight percent of polymer units derived from at least one vinylidene aromatic monomer and from about 20 to about 80 weight percent of polymer units derived from at least one aliphatic olefin having from 2 to about 10 carbon atoms;
dispersed in water to form an aqueous dispersion or emulsion.

The present invention also pertains to a substantially random interpolymer comprising
  (1) from about 30 to about 80 percent by weight of polymer units derived from at least one olefin having from 2 to about 10 carbon atoms;
  (2) from about 20 to about 80 percent by weight of polymer units derived from at least one vinylidene aromatic monomer; and
  (3) from about 1 to about 20 percent by weight of polymer units derived from at least one diene having from 4 to about 10 carbon atoms.

The present invention can comprise, consist of, or consist essentially of, all or only a portion of the components, compounds, substituent groups or reaction steps. Components, compounds, substituent groups or reaction steps can be eliminated singly or in multiples of any two or more.

BRIEF DESCRIPTION OF THE SEVERAL VIEWS OF THE DRAWING

Not Applicable.

DETAILED DESCRIPTION OF THE INVENTION

The term "hydrocarbyl" means any aliphatic, cycloaliphtic, aromatic, aryl substituted aliphatic, aryl substituted cycloaliphatic, alilphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer.

The term "substantially random" in the substantially random interpolymer comprising an a-olefin and a vinylidene aromatic monomer or hindered aliphatic or cycloaliphatic vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method,* Academic Press New York, 1977, pp. 71–78. Preferably, the substantially random interpolymer comprising an a-olefin and a vinylidene aromatic monomer does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the 13C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The compositions of the present invention are dependent on the end use application. For roofing applications, compositions of the present invention comprise (A) from about 99 to about 75, preferably from about 90 to about 75, more preferably from about 85 to about 90 percent by weight of a bituminous material; and (B) from about 1 to about 25, preferably from about 10 to about 25, more preferably from about 10 to about 15 percent by weight of at least one interpolymer comprising polymer units derived from at least one vinylidene aromatic monomer and polymer units derived from at least one aliphatic olefin having from 2 to about 20 carbon atoms.

For pavement applications, compositions of the present invention comprise (A) from about 90 to about 99, more preferably from about 94 to about 97 percent by weight of a bituminous material; and (B) from 1 to about 10, preferably from about 3 to about 6 percent by weight of at least one interpolymer comprising polymer units derived from at least one vinylidene aromatic monomer and polymer units derived from at least one aliphatic olefin having from 2 to about 20 carbon atoms.

BITUMINOUS MATERIALS

The term "bitumen" can generally be defined as mixtures of hydrocarbons of natural or pyrogenous origin or combinations of both, frequently accompanied by their nonmetallic derivatives, which may be gaseous, liquid, semi-solid or solid, and which are usually soluble in carbon disulfide. For the purposes of the present invention, bitumen of a liquid, semi-solid or solid nature may be utilized. From a commercial standpoint, bitumen is generally restricted to asphalts and tars and pitches. A listing of various bituminous materials which can be utilized in the present invention include the following:

I. Asphalts
  1. Petroleum Asphalts
  A. Straight-reduced asphalts
    1. Atmospheric or reduced-pressure reduction
    2. Solvent precipitated, as with propane
  B. Thermal asphalts, as residues from cracking operations on petroleum stocks
  C. Air-blown asphalts
    1. Straight-blown
    2. "Catalytic"-blown
  2. Native Asphalts
  A. With mineral content below 5 percent
    1. Asphaltites such as gilsonite, graphamite, and glance pitch
    2. Bermudez and other natural deposits
  B. With mineral content over 5 percent
    1. Rock asphalts
    2. Trinidad and other natural deposits
II. Tars and Derivatives
  1. Residua from coke-oven-dried coal tars
  A. Coal tars reduced to float grades, as RT (road tar) grades for paving purposes
  B. Coal-tar pitches, with reduction carried out to softening-point grades
  2. Residua from other pyrogenous distillates as from water-gas, wood, peat, bone, shale, rosin, and fatty acid tars.

As can be readily appreciated by those skilled in the art, the weight average molecular weight of the various bitumens can vary over a very wide range, for example such as from about 500 to about 10,000. Additionally, the softening point of the various types of asphalt will also vary such as from about 50° F. to about 400° F.

Of the many types of asphalts which may be utilized, petroleum, and native are desired, with petroleum being preferred. Of the petroleum asphalts, the thermal asphalts are preferred.

INTERPOLYMERS OF OLEFINS AND VINYLIDENE AROMATIC MONOMERS

The interpolymers suitable for blending to make the blends comprising the present invention include, but are not limited to, interpolymers prepared by polymerizing one or more olefins with one or more vinylidene aromatic monomers.

Suitable olefins include for example, those containing from 2 to about 20, preferably from 2 to about 12, more preferably from 2 to about 9 carbon atoms. Preferably, such olefins are α-olefins. Particularly suitable are the α-olefins such as ethylene, propylene, butene-1, 4-methyl-1-pentene, hexene-1 and octene-1.

Suitable vinylidene aromatic monomers include, for example, those represented by the following formula:

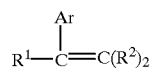

wherein $R^1$ is selected from the group of radicals consisting of hydrogen and hydrocarbyl radicals containing from 1 to about 6 carbon atoms, preferably hydrogen or methyl; each $R^2$ is independently selected from the group of radicals consisting of hydrogen and hydrocarbyl radicals containing from 1 to about 6 carbon atoms, preferably hydrogen or methyl; and Ar is a phenyl group or a phenyl group substituted with from 1 to 5 substituents selected from the group consisting of halo, $C_{1-4}$-alkyl, and $C_{1-4}$-haloalkyl. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred vinylidene aromatic monomers include styrene, α-methyl styrene, the lower alkyl- or phenyl-ring substituted derivatives of styrene, such as ortho-, meta-, and para-methylstyrene, the ring halogenated styrenes, para-vinyl tolulene or mixtures thereof, and the like. A more preferred monovinylidene aromatic monomer is styrene.

In some instances, it may be desirable to employ, in addition to the olefin and vinylidene aromatic monomers, one or more diene monomers in the preparation of the interpolymers employed as component (B) in the present invention. Particularly suitable such dienes include the aliphatic dienes such as, for example, ethylidene norbornene, piperylene, 7-methyl-1,6-octadiene, 1,4-hexadiene, and the dimer of cyclopentadiene or any combination thereof. A preferred diene monomer includes, for example, ethylidene norbornene. These monomers are also suitable for use as the diene monomer (component 3) in the substantially random interpolymers of the present invention.

The interpolymers employed in the present invention as component (B) usually contain from about 30 to about 80, preferably from about 40 to about 75, more preferably from about 50 to about 75 weight percent of polymer units derived from olefin monomer; from about 20 to about 80, preferably from about 25 to about 60, more preferably from about 25 to about 50 weight percent of polymer units derived from vinylidene aromatic monomer; and from about 0 to about 20, preferably from about 2 to about 15, more preferably from about 5 to about 15 weight percent of a diene monomer.

When one or more dienes are included in the preparation of the interpolymers employed as component (B) of the present invention, the interpolymers are usually prepared with (1) from about 30 to about 79, preferably from about 45 to about 75, more preferably from about 40 to about 70 weight percent of one or more olefins; (2) from about 20 to about 70, preferably from about 25 to about 45, more preferably from about 25 to about 40 weight percent of one or more vinylidene aromatic monomers; and (3) from about 1 to about 20, preferably from about 2 to about 15, more preferably from about 5 to about 15 weight percent of one or more dienes.

Particularly useful interpolymers employed in the present invention are substantially random polymers containing polymer units derived from ethylene, polymer units derived from styrene and, optionally, monomer units derived from ethylidene norbornene. These interpolymers usually contain (1) from about 30 to about 80, preferably from about 40 to about 75, more preferably from about 50 to about 75 weight percent ethylene; and (2) from about 20 to about 80, preferably from about 25 to about 60, more preferably from about 25 to about 50 weight percent styrene monomer, and, optionally, (3) ethylidene norbornene in an amount of from about 1 to about 20, preferably from about 2 to about 15, more preferably from about 5 to about 15 weight percent.

While preparing the substantially random or psuedo-random interpolymer, component (B), as will be described hereinafter, an amount of atactic vinylidene aromatic homopolymer may be formed due to homopolymerization of the vinylidene aromatic monomer at elevated temperatures. In general, the higher the polymerization temperature was, the higher is the amount of homopolymer formed. The presence of vinylidene aromatic homopolymer is in general not detrimental for the purposes of the present invention and may be tolerated. The vinylidene aromatic homopolymer may be separated from component (B), if desired, such as by extraction with a suitable extracting agent, acetone or chloroform. For the purpose of the present invention it is preferred that in component (B) no more than 20 percent by weight, based on the weight of component (B), more preferably less than 10 weight percent of vinylidene aromatic homopolymer is present.

Examples of suitable catalysts and methods for preparing the substantially random interpolymers are disclosed in U.S. application Ser. No. 545,403, filed Jul. 3, 1990 (EP-A-416, 815); U.S. application Ser. No. 702,475, filed May 20, 1991 (EP-A-514,828); U.S. application Ser. No. 876,268, filed May 1, 1992, (EP-A-520,732); U.S. application Ser. No. 241,523, filed May 12, 1994; as well as U.S. Pat. Nos.: 5,055,438; 5,057,475; 5,096,867; 5,064,802; 5,132,380; 5,189,192; 5,321,106; 5,347,024; 5,350,723; 5,374,696; and 5,399,635 all of which patents and applications are incorporated herein by reference.

The polymerization is conducted according to known techniques for Ziegler-Natta or Kaminsky-Sinn type polymerizations. That is, the monomer(s) and catalyst are contacted at a temperature from −30° C. to 250° C., typically at elevated pressures. The polymerization is conducted under an inert atmosphere which may be a blanketing gas such as nitrogen, argon, hydrogen, ethylene, etc.. Hydrogen may additionally be utilized in the control of molecular weight as is previously known in the art. The catalyst may be used as is or supported on a suitable support such as alumina, $MgCl_2$ or silica to provide a heterogeneous supported catalyst. A solvent may be employed if desired. Suitable solvents include toluene, ethylbenzene, and excess vinylidene aromatic or olefin monomer. The reaction may also be conducted under solution or slurry conditions, in a suspension utilizing a perfluorinated hydrocarbon or similar liquid, in the gas phase, i.e. utilizing a bed reactor, or in a solid phase powder polymerization. A catalytically effective amount of the present catalyst and cocatalyst are any amounts that successfully result in formation of polymer. Such amounts may be readily determined by the routine experimentation by the skilled artisan. Preferred amounts of catalyst and cocatalyst are sufficient to provide an equivalent ratio of addition polymerizable monomer:catalyst ratio of from $1\times10^{10}$:1 to 100:1, preferably from $1\times10^{10}$:1 to 500:1, most preferably $1\times10^{10}$:1 to 1,000:1. The cocatalyst is generally utilized in an amount to provide an equivalent ratio of cocatalyst:catalyst ratio from 10,000:1 to 0.1:1, preferably from 1,000:1 to 1:1.

The resulting polymeric product is recovered by filtering or other suitable technique.

Also suitable are the substantially random interpolymers which possess at least one α-olefin/vinyl aromatic/vinyl aromatic/α-olefin tetrad disclosed in a copending application by Francis J. Timmers et al. filed Sep. 4, 1996. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon13 NMR chemical shifts of these interpolymers, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one a-olefininsertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon13 NMR peaks but with slightly different chemical shifts.

These interpolymers are prepared by conducting the polymerization at temperatures of from about −30° C. to about 250° C. in the presence of such catalysts as those represented by the formula

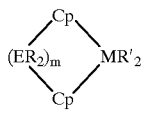

wherein: each Cp is independently, each occurrence, a substituted cyclopentadienyl group n-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

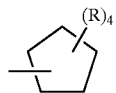

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl, or hydrocarbyl substituted derivatives of such fused ring system compounds.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenylindenyl)) zirconium 1,4-diphenyl-1,3-butadiene, racemic-(dimethylsilanediyl)-bis-(2-methyl-4-phenylindenyl)) zirconium di-$C_{1-4}$ alkyl, racemic-(dimethylsilanediyl)-bis-(2-methyl-4-phenylindenyl)) zirconium di-$C_{1-4}$ alkoxide, or any combination thereof and the like.

Additives and adjuvants may be incorporated in the polymers employed in the present invention in order to provide desirable characteristics. Suitable additives include pigments, UV stabilizers, antioxidants, blowing agents, lubricants, plasticizers, photosensitizers, and mixtures thereof.

In the preparation of copolymers containing vinylidene aromatic monomers it is desirable that a comonomer that is an α-olefin that is not particularly sterically hindered also be employed. Without wishing to be bound by any particular theory of operation, it is believed this is because the active site becomes crowded with the incorporation of the hindered vinyl compound making it unlikely that another hindered vinyl compound could enter into the polymerization as the next monomer in the sequence. After the incorporation of one or more olefins other than a hindered vinyl compound the active site once again becomes available for inclusion of a hindered vinyl monomer. On a limited basis however, the vinylidene aromatic monomer or sterically hindered vinyl monomer may insert into the polymer chain in reverse order, ie. so as to result in two methylene groups between the substituted polymer backbone moieties.

Preferably such polymers possess a Mw of greater than 13,000, more preferably greater than 20,000 and most preferably greater than 30,000. Also preferably such polymers possess a melt index ($I_2$), ASTM D-1238 Procedure A, condition E, of less than 125, more preferably from 0.01–100 and most preferably from 0.1 to 10.

Prior to polymerization, the monomers and solvents, if any, may be purified by vacuum distillation, and/or contacted with molecular sieves, silica, or alumina to remove impurities. In addition, reactive blanking agents, such as trialkylaluminum compounds, alkali metals and metal alloys, especially Na/K, may be used to remove impurities.

The compositions of the present invention are prepared by admixing the interpolymer with the bituminous material in any convenient manner employing the equipment which is normally used in paving, roofing and other construction projects. Typically, the bitumen is maintained at an elevated temperature, 150° to 180° C. for example, while the prescribed amount of substantially random interpolymer is milled into the bitumen using a high shear blender (such as a Silverson operating at 3500–4000 rpm.) After the prescribed length of time, high shear mixing is followed by low shear mixing at the elevated temperature for a prescribed time period (such as 30 minutes at 300 rpm with a paddle type mixer). Alternatively, the compositions of the present invention may be prepared by admixing the is interpolymer with the bituminous material at temperatures of 150–240° C., using only a low shear paddle type mixer. The polymeric material component (B) is typically used as a divided solid but may be used as a solution, in a solvent e.g. toluene, which is then mixed into molten asphalt. Optionally, other additives can be mixed with the blend such as fillers, e.g. sand, gravel and other aggregates normally employed in such material.

When the interpolymers employed as component (B) in the present invention contain an incorporated diene monomer, it is often desired and usually preferred to employ in the composition a crosslinking material, component (C), such as sulfur and/or a sulfur containing crosslinking material such as, for example, methyl tuads, tetramethylthiuram disulfide, dimorpholinyl disulfide, dibutylxanthogen disulphide or any combination thereof. The preferred crosslinking material is sulfur.

When a crosslinking material is employed in the composition of the present invention, the amount of crosslinker (C) employed is from about 1 to 20, preferably from about 1 to about 15, more preferably from about 5 to 15 percent by weight based on the amount of component (A).

When component (C) (a crosslinking material) is employed, it can be preblended with component (A) followed by blending the resulting material with component (B) or it can be blended with a preblend of components (A) and (B). Blending in either case is done at a temperature of from about 130° C. to about 200° C., preferably from about 150° C. to about 190° C., more preferably from about 170° C. to about 180° C.

Compositions of components (A), (B) and (C) in which component (B) is a substantially random interpolymer with incorporated diene monomer are advantageous because over-crosslinking of the blend is not an issue thereby leading to safer operations. In blends in which the polymer additives are, for example, highly unsaturated SBS triblock polymers (styrene—butadiene—styrene), over addition of sulfur will result in a highly crosslinked gelled material which will set up in the process, storage or application equipment. The polymeric components of the present invention will only crosslink to the extent of unsaturation (i.e. diene content which is readily controlled during its preparation) allowing an excess of sulfur to be used.

It has been further discovered that the suitability of the substantially random polymers as component (B) for a particular application in the present invention is, to a large extent, governed by a balance of two properties of this component, α-olefin content and melt index, $I_2$. In general, for ethylene/styrene/diene substantially random interpolymers within the specified composition ranges, materials with high ethylene contents must have a relatively high melt index for compatibility in the blend whereas component (B) with a low ethylene content must have a relatively low melt index to maintain the other useful properties of the blend.

The compositions of the present invention are useful in paving, roofing, water proof coatings and the like applications.

The aqueous dispersions or emulsions of the present invention can be prepared by first preparing a hot mix blend of the interpolymer and bituminous material followed by dispersion of this blend in water to form an aqueous dispersion or emulsion.

Another method for preparing the dispersions or emulsions of the present invention is to first prepare a dispersion or emulsion of the bituminous material in water followed by blending with a previously formed dispersion or emulsion of interpolymer in water.

Dispersions or emulsions of bituminous materials in water are well known and are available commercially.

Dispersion or emulsions of the interpolymers in water can be prepared as described by Walther et al. in U.S. Pat. No. 5,574,091 which is incorpoarted herein by reference.

The aqueous dispersions of bituminous material and interpolymer of the present invention are useful as chip seals and slurry seals in paving applications.

The following examples are illustrative of the invention, but are not to be construed as to limiting the scope thereof in any manner.

The following test procedures are employed in determining the various properties of the interpolymers employed in the blends and on the blends.

Olefin and Vinylidene Aromatic Content

The composition of the substantially random interpolymers is determined using $^{13}C$ NMR spectroscopy by procedures as disclosed by Oliva et al. in *Macromolecules*, 1995 (28), pp 4665–4667 and Ren et al. in *Macromolecules*, 1995 (28), pp 2588–2589 or by proton NMR spectroscopy.

Melt Index ($I_2$)

Determined according to ASTM D-1238, Procedure A, Condition E.

Compatibility

A portion of the polymer-bitumen blend is poured into a 2 mm×42 mm aluminum tube and placed in a forced air oven set at 160° C. for 72 hours. The tube is removed from the oven, allowed to cool to ambient temperature and then placed in dry ice. When the blend has reached dry ice temperature, the aluminum tube is peeled from the blend and the blend is cut in half to give a top and bottom. The softening point is determined for the top and bottom halves according to ASTM D-3461-85. If the top and bottom softening points differ by more than 2.5° C., the polymer is deemed to be incompatible in the bitumen.

Ductility

Determined according to ASTM D-113-86.

Rutting Parameter

Rutting parameter (as G*/sin d) is obtained according to the procedures of American Association of State Highway Transportation Officers (AASHTO) provisional method TP5.

Viscosity

Viscosity is obtained according to the procedures of ASTM D-4402-87.

EXAMPLE 1

Preparation of the interpolymer Component (B), ES-1 to ES-10

Ethylene/styrene interpolymers and ethylene/styrene/ethylidene norbornene substantially random interpolymers are made using (tert-butyl-amido)di-methyl(tetramethyl-h$^5$-cyclopentadienyl)silane dimethyltitanium(+4) catalyst and tris(pentafluorophenyl)borane cocatalyst in a one to one ratio according to the following general procedure. A two liter stirred reactor is charged with the desired amounts of mixed alkane solvent (Isopar-E available from Exxon Chemicals Inc.), styrene monomer and optionally ethylidene norbornene. If hydrogen is used for molecular weight control, it is then added to the reactor by differential pressure expansion (pressure difference indicated by delta) from a 75 mL addition tank. The contents of the reactor are heated to the desired temperature followed by saturation with ethylene at the desired pressure. The desired quantities of catalyst and cocatalyst are mixed in Isopar-E or toluene and the resulting solution is transferred to a catalyst addition tank and injected into the reactor.

Polymerization is allowed to proceed with ethylene on demand. Additional charges of catalyst and cocatalyst, if used, are prepared in the same manner and are added to the reactor periodically. After the run time, the polymer solution is removed from the reactor and quenched with isopropyl alchohol. A hindered phenol antioxidant (IRGANOX™ 1010 available from Ciba Geigy Corp.) is added to the polymer solution. Volatiles are removed from the polymers in a vacuum oven at about 120° C. for about 20 hours. The substantially random interpolymers are found to contain small amounts of amorphous polystyrene homopolymer.

The preparation conditions for the substantially random interpolymers ES-1 to ES-10 are listed in Table 1.

TABLE 1

Preparation Conditions for the Substantially random Interpolymers

| Desig-nation | Iso-par-E (g) | Sty-rene (g) | Ethyl-ene (MPa[b]) | ENB[a] (ml) | H$_2$ (delta MPa[b]) | Temp. (° C.) | Time (min.) | Catalyst ($\mu$ mol) | Yield (g) |
|---|---|---|---|---|---|---|---|---|---|
| ES-1  | 365 | 461 | 1.38 | 0  | 0     | 80  | 20 | 6.5 | 67.C |
| ES-2  | 361 | 454 | 1.21 | 0  | 0     | 80  | 20 | 7   | 63.5 |
| ES-3  | 361 | 458 | 1.38 | 0  | 1.03  | 80  | 30 | 10  | 95.5 |
| ES-4  | 361 | 458 | 1.38 | 0  | 0.689 | 90  | 30 | 12  | 90.0 |
| ES-5  | 361 | 457 | 1.03 | 0  | 0.689 | 80  | 30 | 8   | 92.4 |
| ES-6  | 361 | 461 | 1.38 | 0  | 1.38  | 100 | 32 | 19  | 103.9 |
| ES-7  | 304 | 455 | 1.38 | 75 | 0.689 | 90  | 30 | 25  | 93.0 |
| ES-8  | 369 | 450 | 1.55 | 0  | 0     | 80  | 20 | 4.5 | 59.8 |
| ES-9  | 361 | 458 | 1.72 | 0  | 1.05  | 80  | 30 | 7   | 90.1 |
| ES-10 | 361 | 461 | 1.72 | 0  | 1.38  | 90  | 30 | 8   | 96.4 | a Ethylidene norbornene (a diene)
b Mega Pascals.

The substantially random interpolymers ES-11 to ES-12 are prepared according to the following procedure.

Polymer is prepared in a 400 gallon agitated semi-continuous batch reactor. The reaction mixture consisted of approximately 250 gallons a solvent comprising a mixture of cyclohexane (85wt %) & isopentane (15wt %), and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components Titanium: (N-1,1-dimethylethyl)dimethyl(1-(1,2,3,4,5-eta)-2,3,4,5-tetramethyl-2,4-cyclopentadien-1-yl)silanaminato))(2-)N)-dimethyl, CAS# 135072-62-7 and Tris(pentafluorophenyl)boron, CAS# 001109-15-5, Modified methylaluminoxane Type 3A, CASE 146905-79-5 are flow controlled, on a mole ratio basis of 1/3/5 respectivily, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox* 1010 anti-oxidant is then added to the solution and the polymer is isolated from the solution The resulting polymers are isolated from solution by either stripping with steam in a vessel or by use of a devolatilizing extruder. In the case of the steam stripped material, additional processing is required in extruder like equipment to reduce residual moisture and any unreacted styrene.

| Sample Number | Solvent loaded | | Styrene loaded | | Pressure | | Temp. | Total H$_2$ Added | Run Time | Polymer in Solution |
|---|---|---|---|---|---|---|---|---|---|---|
|  | lbs | kg | lbs | kg | Psig | kPa | ° C. | Grams | Hours | Wt. % |
| ES-11 | 841 | 381 | 662  | 300 | 105 | 724 | 60 | 34 | 4.9 | 9.8 |
| ES-12 | 252 | 114 | 1320 | 599 | 40  | 276 | 60 | 23 | 6.5 | 18.0 |

| Sample Number | Melt Index | Total Wt % Styrene in Polymer | Talc Level Wt % | Isolation Method |
|---|---|---|---|---|
| ES-11 | 1.0 | 48.3 | <3.5 | Stm. Str. |
| ES-12 | 1.8 | 81.6 | <2.0 | " |

POE is an ethylene/octene copolymer prepared in the following manner.

Catalyst and Cocatalysts Employed

Titanium: (N-1,1-dimethylethyl)dimethyl(1-(1,2,3,4,5-eta)-2,3,4,5-tetramethyl-2,4-cyclopentadien-1-yl)silanaminato))(2-)N)-dimethyl: CAS# 135072-62-7

Tris(pentafluorophenyl)boron: CAS# 1109-15-5

MMAO: CAS# 146905-79-5

Polymerization

The ethylene/octene copolymer is produced in a solution polymerization process using a well-mixed CSTR (continuously stirred tank reactor) reactor. Each polymer is stabilized with 1250 ppm of Calcium Stearate, 500 ppm IRGANOX™ 1076, and 800 ppm PEP Q.

The ethylene and the hydrogen (as well as any ethylene and hydrogen which are recycled from the separator, are combined into one stream before being introduced into the diluent mixture, a mixture of $C_8$–$C_{10}$ saturated hydrocarbons, e.g., ISOPAR™-E (available from Exxon Chemical Company) and the comonomer 1-octene.

The metal complex and cocatalysts are combined into a single stream and are also continuously injected into the reactor. The catalyst is as above; the primary cocatalyst is tri(pentafluorophenyl)borane, available from Boulder Scientific as a 3 wt % solution in ISOPAR™-E mixed hydrocarbon; and the secondary cocatalyst is modified methylalumoxane (MMAO Type 3A), available from Akzo Nobel Chemical Inc. as a solution in heptane having 2 wt % aluminum.

Sufficient residence time is allowed for the metal complex and cocatalyst to react prior to introduction into the polymerization reactor. The reactor pressure is held constant at about 475 psig.

After polymerization, the reactor exit stream is introduced into a separator where the molten polymer is separated from the unreacted comonomer(s), unreacted ethylene, unreacted hydrogen, and diluent mixture stream, which is in turn recycled for combination with fresh comonomer, ethylene, hydrogen, and diluent, for introduction into the reactor. The molten polymer is subsequently strand chopped or pelletized, and, after being cooled in a water bath or pelletizer, the solid pellets are collected. The following table describes the polymerization conditions and the resultant polymer properties.

| | |
|---|---|
| Ethylene fresh feed rate | |
| (lbs/hr) | 69 |
| (kg/hr) | 31.30 |
| Total ethylene feed rate | |
| (lbs/hr) | 77 |
| (kg/hr) | 34.93 |
| Fresh octene feed rate | |
| (lbs/hr) | 52 |
| (kg/hr) | 23.59 |
| Total octene feed rate | |
| (lbs/hr) | 120 |
| (kg/hr) | 54.43 |
| Total octene concentration (weight %) | 11.5 |
| Fresh hydrogen feed rate (standard cm³/min) | 0 |
| Solvent and octene feed rate | |
| (lbs/hr) | 1046 |
| (kg/hr) | 474.46 |
| Ethylene conversion rate (wt %) | 75.6 |
| Reactor temperature (° C.) | 98 |
| Feed temperature (° C.) | 15 |
| Catalyst concentration (ppm) | 79 |
| Catalyst flow rate | |
| (lbs/hr) | 0.237 |
| (kg/hr) | 0.108 |
| Primary cocatalyst concentration (ppm) | 2288 |

-continued

| | |
|---|---|
| Primary cocatalyst flow rate | |
| (lbs/hr) | 0.265 |
| (kg/hr) | 0.120 |
| Secondary cocatalyst concentration (ppm) | 698 |
| Secondary cocatalyst flow rate | |
| (lbs/hr) | 0.137 |
| (kg/hr) | 0.062 |
| Product density (g/cm³) | 0.860 |
| Polymer melt index ($I_2$ at 190° C.)* | 13 |

The ethylene/octene copolymer has a density of 0.860 obtained by ASTM 792; an $I_2$ of 13 obtained by ASTM D-1238; and $I_{10}$ of 92.25 obtained by ASTM D-1238; an octene content of 43 wt. (15.9 mole) percent.

Unblended Baytown AC-10 bitumen is available from Exxon.

Table 2 provides the properties of the various polymers employed in the blends.

TABLE 2

Polymer Properties

| Polymer Designation | Styrene Content Wt. % | Mol % | Melt Index ($I_2$) |
|---|---|---|---|
| ES-1 | 36.4 | 13.4 | 0.05 |
| ES-2 | 39.7 | 15.1 | 0.08 |
| ES-3 | 36.3 | 13.3 | 0.49 |
| ES-4 | 32.0 | 11.2 | 1.08 |
| ES-5 | 42.6 | 16.7 | 0.51 |
| ES-6 | 34.3 | 12.3 | 7.12 |
| ES-7* | 35.3 | 14.9 | 10.15 |
| ES-8 | 32.9 | 11.7 | <0.05 |
| ES-9 | 26.5 | 8.8 | 0.64 |
| ES-10 | 27.7 | 9.4 | 1.73 |
| ES-11 | 48.3 | 20.1 | 1.28 |
| ES-12 | 81.6 | 54.4 | 1.30 |

*Interpolymer ES-7 contains 35.3 wt. (14.9 mol) percent styrene; 50.9 wt. (80 mol) percent ethylene; & 13.8 wt (5.1 mol).percent ethylidene norbornene.

Preparation of the Bitumen—Polymer Blends

Exxon Baytown AC-10 bitumen is heated and maintained at 170° to 180° C. while 3.5% (by weight based on aphalt+polymer) -polymeric material is milled into the bitumen using a a Silverson LD-4 high shear blender operating at 3500–4000 rpm. Thirty minutes of high shear mixing is followed by 30 minutes of low shear mixing at 170° to 180° C. using paddle type mixer operating at 300 rpm. If the polymer is to be sulfur crosslinked, 0.5 weight percent sulfur is added to the polymer bitumen blend at this point and the blend is mixed under low shear for the prescribed length of time.

Table 3 provides the polymeric sample properties as well as the blend properties.

TABLE 3

Polymer and Asphalt Blend Properties in Exxon Baytown AC-10 Asphalt

| | Polymer | | | Blend | | | | |
|---|---|---|---|---|---|---|---|---|
| Sample Designation | Type | $I_2$ | Wt. % Styrene | % Polymer in Blend | Viscosity[a] @ 135° C. (cps/Pa-s) | S.H. R.P.[b] (G*/sin δ) | Softening Point (Top/Bottom); ° C. | Compatibility | Ductility (4° C. cm) |
| 1 | ES-1 | 0.05 | 36.4 | 3.5 | 3035/3.035 | 5390 | 71.5/70.9 | YES | 32.5 |
| 2 | ES-2 | 0.08 | 39.7 | 3.5 | 3485/3.485 | 3790 | 63.9/63.8 | YES | 35.3 |
| 3 | ES-3 | 0.49 | 36.3 | 3.5 | 1240/1.240 | 2710 | 69.8/68.1 | YES | 36.4 |
| 4 | ES-4 | 1.08 | 32.0 | 3.5 | 1193/1.193 | 2610 | 76.1/73.9 | YES | 26.6 |
| 5 | ES-5 | 0.51 | 42.6 | 3.5 | 1208/1.208 | 3080 | 54.6/53.2 | YES | 28.9 |
| 6 | ES-6 | 7.12 | 34.3 | 3.5 | 650/0.650 | 3000 | 64.3/64.3 | YES | 27.1 |
| 7 | ES-11 | 1.28 | 48.3 | 3.5 | 920/0.920 | 2392 | 51.9/51.9 | YES | 24.8 |
| 8 | ES-12 | 1.30 | 81.6 | 3.5 | 430/0.430 | 1667 | 47.3/47.3 | YES | 7.0 |
| A** | None | na[c] | na[c] | 0 | 280/0.280 | 919 | na[c] | na[c] | 7.5 |
| B** | ES-8 | <0.05 | 32.9 | 3.5 | 3105/3.105 | 3560 | 76.6/71.8 | NO | 36.7 |
| C** | ES-9 | 0.64 | 26.5 | 3.5 | 1350/1.35 | 2780 | 80.2/75.6 | NO | 21.1 |
| D** | ES-10 | 1.73 | 27.7 | 3.5 | 990/0.990 | N.D.[d] | 81.3/74.1 | NO | |
| E** | POE | 13 | nac | 3.5 | 650/0.650 | 2410 | 52.7/49.8 | NO | 7.3 |

**Not an example of the present invention.
a Brookfield Viscosity
b S.H.R.P. = Strategic Highway Research Program, rutting parameter
c na = not applicable
d Not Determined Table 3 shows that not all ethylene/styrene substantially random interpolymers are suitable as asphalt modifiers. All ethylene/styrene substantially random interpolymers which are compatable with the asphalt do show improved properties over the unmodified AC-10 asphalt (sample A, no polymer).

By employing a polymer that has a melt index that is too low, compatibility is sacrificed (see sample B). Without wishing to be bound by a particular theory, it is believed that polymeric modifier molecular weight is governing this phenomenon. As the melt index decreases the polymer molecular weight increases along with the performance properties of the blend. A polymer with a molecular weight that is too high results in an incompatable polymer-asphalt blend.

It can be seen in Table 3 that styrene content in the ethylene/styrene substantially random interpolymers also is an important variable in that it controls the performance properties of the blends and compatibilities of the polymeric modifiers in the asphalt. At lower styrene contents, substantially random polymers with comparable melt indices show improved blend performance properties as indicated by the rutting parameter (S.H.R.P.), softening points and ductility (compare blend 3 to blend 5 and blend 7 to blend 8). However, as the styrene content becomes too low, compatibility is sacrificed (compare blends 3 and 5 to C).

Preparation of Crosslinked Bitumen—ES Sample Blends.

Exxon Baytown AC-10 bitumen is heated and maintained at 170° C. while 3.5 % (by weight) of the indicated amount of substantially random interpolymer or comparative polymeric material is milled into the bitumen using a Silverson Model blender. The temperature is maintained at 160° C. and 0.5 weight percent (based on asphalt+polymer+sulfur) of sulfur is added to the polymer—bitumen blend at this point and the blend is mixed under low shear for the prescribed length of time.

Table 4 provides the blend mix time, properties of the uncrosslinked and crosslinked blend and the polymer used as component (B).

TABLE 4

Crosslinked Asphalt Blend Properties

| Blend Designation | Polymer in Blend Type | wt. % | Sulfur Mix Time (min.) | Viscosity[a] (cps @ 135° C.) | Softening Point(° C.) | S.H.R.P. (G*/sin δ) |
|---|---|---|---|---|---|---|
| XLB-1 | ES-7 | 3.5 | 0[b] | 568 | 47.5 | 1610 |
| XLB-2 | ES-7 | 3.5 | 30 | 670 | 48.9 | 1920 |
| XLB-3 | ES-7 | 3.5 | 180 | N. D.[c] | N. D.[c] | 3580 | a Brookfield Viscosity.
b No crosslinking.
c Not Determined.

Table 4 shows the effect of sulfur crosslinking the asphalt-polymer blend. A smaller level of crosslinking leads to both an increase in the softening point of the blend and an increase in the rutting parameter (S.H.R.P.), compare XLB-1 vs XLB-2.. Longer crosslinking times lead to increased crosslinking as indicated by a favorable increase in the rutting parameter (S.H.R.P.), compare XL-2 and XL-3. Both crosslinked blends, XLB 2 & XLB-3 possess an improved rutting parameter (S.H.R.P.) when compared to the uncrosslinked blend, XLB-1.

EXAMPLE 2

Preparation of E/S Interpolymers Designated as ES-13, 14, 15, 17, 18 & 19

Reactor Description

The single reactor used was a 6 gallon (22.7 L), oil jacketed, Autoclave continuously stirred tank reactor (CSTR). A magnetically coupled agitator with Lightning A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor was a micromotion flow meter that measured flow and solution density. All lines on the exit of the reactor were traced with 50 psi (344.7 kPa) steam and insulated.

Catalyst Components

| Polymer Designation | Titanium Compound (Catalyst) Type | Boron Compound (Cocatalyst) Type | Boron/Ti Ratio | MMAO (Secondary Cocatalyst) Al/TI Ratio |
|---|---|---|---|---|
| ES-13 | A[a] | A[c] | 1.25 | 10 |
| ES-14 | A[a] | A[c] | 1.25 | 10 |
| ES-15 | A[a] | A[c] | 1.25 | 10 |
| ES-17 | B[b] | A[c] | 1.25 | 6 |

-continued

| Polymer Designation | Titanium Compound (Catalyst) Type | Boron Compound (Cocatalyst) Type | Boron/Ti Ratio | MMAO (Secondary Cocatalyst) Al/TI Ratio |
|---|---|---|---|---|
| ES-18 | B[b] | A[c] | 1.25 | 6 |
| ES-19 | B[b] | A[c] | 1.25 | 6 |

[a]has the following structure

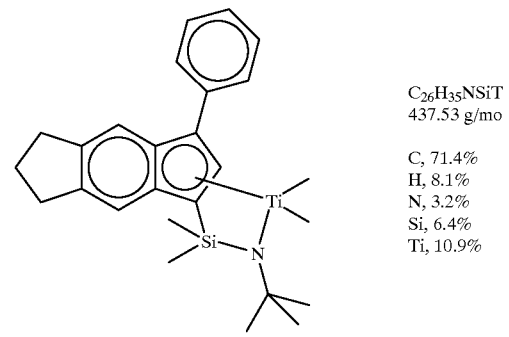

$C_{26}H_{35}NSiT$
437.53 g/mo

C, 71.4%
H, 8.1%
N, 3.2%
Si, 6.4%
Ti, 10.9%

[b](t-butylamido)dimethyl(tetramethylcyclopentadienyl)silanetitanium (II) 1,3-pentadiene.
[c]a mixture of long chain ammonium borate salts (C18–C22).

b (t-butylamido)dimethyl(tetramethylcyclopentadienyl) silanetitan ium (II) 1,3-pentadiene.

c a mixture of long chain ammonium borate salts (C18–C22).

Procedure

Ethylbenzene solvent was supplied to the mini-plant at 30 psig (207 kPa). The feed to the reactor was measured by a Micro-Motion ass flow meter. A variable speed diaphragm pump controlled the feed rate. At the discharge of the solvent pump a side stream was taken to provide flush flows for the catalyst injection line (1 lb./hr (0.45 kg/hr)) and the reactor agitator (0.75 lb./hr ( 0.34 kg/ hr)). These flows were measured by differential pressure flow meters and controlled by manual adjustment of micro-flow needle valves. Uninhibited styrene monomer was supplied to the mini-plant at 30 psig (207 kpa). The feed to the reactor was measured by a Micro-Motion mass flow meter. A variable speed diaphragm pump controlled the feed rate. The styrene streams was mixed with the remaining solvent stream. Ethylene was supplied to the mini-plant at 600 psig (4,137 kPa). The ethylene stream was measured by a Micro-Motion mass flow meter just prior to the Research valve controlling flow. A Brooks flow meter/controllers was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to −5° C. by an exchanger with −5° C. glycol on the jacket. This stream entered the bottom of the reactor. The three component catalyst system and its solvent flush also enter the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occured as the effluent exited the post reactor heater and the pressure was dropped from 475 psig (3,275 kPa) down to −250mm of pressure absolute at the reactor pressure control valve. This flashed polymer entered a hot oil jacketed devolatilizer. Approximately 85 percent of the volatiles were removed from the polymer in the devolatilizer. The volatiles exit the top of the devolatilizer. The stream was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer seperated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

| Polymer Designation | Reactor Temp. ° C. | Solv. Flow lb/hr | Solv. Flow kg/hr | Ethylene Flow lb/hr | Ethylene Flow kg/hr | Hydrogen Flow SCCM* | Styrene Flow lb/hr | Styrene Flow kg/hr | Vent Conv. % |
|---|---|---|---|---|---|---|---|---|---|
| ES-13 | 90.2 | 29.9 | 13.57 | 2.9 | 1.32 | 20.9 | 9.0 | 4.09 | 91.9 |
| ES-14 | 84.1 | 28.4 | 12.89 | 2.3 | 1.04 | 16.0 | 10.5 | 4.77 | 92.8 |
| ES-15 | 73.7 | 13.5 | 6.13 | 1.2 | 0.54 | 9.0 | 12.0 | 5.45 | 87.1 |
| ES-17 | 73.6 | 17.2 | 3.55 | 1.5 | 0.68 | 2.7 | 12.0 | 5.45 | 82.5 |
| ES-18 | 90.6 | 23.4 | 10.62 | 2.0 | 0.91 | 2.8 | 14.0 | 6.35 | 85.6 |
| ES-19 | 105.2 | 29.1 | 13.21 | 3.0 | 1.36 | 5.0 | 9.0 | 4.09 | 89.0 |

*Standard cubic centimeters per minute.

Preparation of E/S Interpolymer Designated as ES-16

Same procedure as for preparing ES-11 & 12 in Example 1. The data is pesented in the following Table.

| Sample Number | Solvent loaded lbs | Solvent loaded kg | Styrene loaded lbs | Styrene loaded kg | Pressure Psig | Pressure kPa | Temp. ° C. | Total H$_2$ Added Grams | Run Time Hours | Polymer in Solution Wt. % |
|---|---|---|---|---|---|---|---|---|---|---|
| ES-16 | 252 | 114 | 1320 | 599 | 42 | 290 | 60 | 0 | 2.8 | 11.5 |

| Sample Number | Melt Index | Total Wt % Styrene in Polymer | Talc Level Wt % | Isolation Method |
|---|---|---|---|---|
| ES-16 | 0.18 | 81.7 | <2.5 | Stm. Str. |

The characteristics of the polymers are given in Table 5.

TABLE 5

| Polymer Designation | Percent Styrene Total[a] Wt. | Polymer[b] Wt. | Melt Index $I_2$ g/10 min. | Percent aPS[c] |
|---|---|---|---|---|
| ES-13 | 44   | 43   | 1.0  | <3   |
| ES-14 | 57.2 | 56   | 1.08 | <3   |
| ES-15 | ~75  | 68.2 | 1.16 | <10  |
| ES-16 | 81.7 | 72.5 | 0.18 | 8.6  |
| ES-17 | 56.5 | 51   | 0.4  | ~9   |
| ES-18 | 46.5 | 37   | 0.6  | 13   |
| ES-19 | 31   | 23.4 | 1.08 | 7.5  | a Amount of styrene in copolymer plus the amount of styrene in atactic polystyrene.
b Amount of styrene in copolymer.
c Amount of atactic polystyrene in polymer produced in reactor.

Compatibility of E/S Interpolymers in Asphalt

Asphalt is found naturally or is attainable as a by-product of crude oil refining. The compositional makeup of crude oils and natural asphalts vary widely depending upon the geographical origin. As a result, the physical characteristics of any asphalt material, whether manufactured or natural, differs markedly from any other.

Because of the chemical complexity of asphalts, it is not possible to predict the interaction/compatibility of the asphalt with a polymer or other modifier, based solely on its chemical composition. For the same reasons, it is not possible to predict the interaction of the asphalt with a polymer or other modifier based on the molecular characteristics (Asphaltenes, Aromatics, Saturates, Resins) commonly used in the past to characterize asphalts.

In order to better define the ideal interpolymer composition range for achieving good compatibility with a wide range of asphalt compositions, blends of 4 percent interpolymer were prepared (samples ES-13 -ES-19) in each of the following asphalts.

In the compatibility test, the various asphalts employed were as follows:

Citgo AC-10 an asphalt produced from Venezualan crude produced by Cities Service Company.

Murphy 120-150 an asphalt produced from N. W. Canadian crude oil produced by Murphy Oil Co.

Fina AC-10 an asphalt produced from West Texas Sour Crude crude oil (WTS) produced by FINA Oil & Chemical Co.

DS AC-10 an asphalt produced from West Texas Intermediate crude oil (WTI) produced by Diamond Shamrock.

Marathon AC-10 an asphalt produced from Arabian heavy crude oil produced by Marathon Oil Co.

Conoco AC-10 an asphalt produced from Wyoming sour crude oil (WY) produced by Conoco Oil Co.

For all of the interpolymer samples shown in Table 6, the blends with asphalt were prepared by employing a low-shear paddle type agitator and mixing for 2 hours at 450 F. For the SBS sample, shown in Table 6, the blend with asphalt was prepared by mixing with a high shear Silverson mixer for 2 hours at 375 F. High shear mixers are typically employed for blending SBS polymers into asphalt commercially. The SBR sample, shown in Table 6, was blended with asphalt using a low shear paddle type agitator and mixing for 1 hour at 325 deg F. Compatibility of the polymer/asphalt blends was determined according to the procedure outlined earlier. The values shown in Table 6 are the difference in the softening points at the top of the blend vs the bottom of the blend. A low softening point difference is desired, with values of around 10 deg F or lower being preferred. A large difference in softening points is indicative of separation of the polymer from the asphalt, which is undesirable. The results of the compatibility test are in Table 6.

TABLE 6

| Polymer | | Softening Point Difference, Top/Bottom | | | | | | | | | | | |
|---|---|---|---|---|---|---|---|---|---|---|---|---|---|
| Designation | Wt. Percent Styrene in E/S | Venez Citgo AC-10 | | Canadian Murphy 120–150 | | WTS Fina AC-10 | | WTI DS AC-10 | | Arab Hvy Marathon AC-10 | | WY Sour Conoco AC-10 | |
| | | °F. | °C. | °F. | °C. | °F. | °C. | °F. | °C. | °F. | °C. | °F. | °C. |
| ES-19 | 23.4 | 51 | 28.3 | 52 | 28.9 | 57 | 31.7 | 42 | 23.3 | 59 | 32.8 | 44 | 24.4 |
| ES-18 | 37   | 13 | 7.2  | 23 | 12.8 | 0  | 0    | 3  | 1.7  | 15 | 8.3  | 2  | 1.1  |
| ES-13 | 43   | 1  | 0.6  | 9  | 5.0  | 1  | 0.6  | 1  | 0.6  | 5  | 2.8  | 20 | 11.1 |
| ES-17 | 51   | 8  | 4.4  | 8  | 4.4  | 4  | 2.2  | 9  | 5.0  | 10 | 5.6  | 10 | 5.6  |
| ES-14 | 56   | 19 | 10.6 | 7  | 3.9  | 4  | 2.2  | 0  | 0    | 6  | 3.3  | 23 | 12.8 |
| ES-15 | 68.2 | 51 | 28.3 | 2  | 1.1  | 1  | 0.6  | 4  | 2.22 | 21 | 11.7 | 34 | 18.9 |
| ES-16 | 72.5 | 41 | 22.8 | 78 | 43.3 | 4  | 2.2  | 4  | 2.22 | 88 | 48.9 | 89 | 49.4 |
| SBS* | — | 55 | | 13 | | 3 | | 7 | | 9 | | 57 | |
| SBR* | — | 82 | | 85 | | 5 | | 133 | | 88 | | 82 | |

*Not an example of the present invention.

Examination of the data shows that interpolymer samples with wt % styrene in the 37–56% range (ES-18, ES-13, ES-17, and ES-14) had the best compatibility across the wide range of asphalt types tested. Sample ES-19 with a relatively low wt % styrene of only 23.4%, had very poor asphalt compatibility. Similarly, samples ES-15 and ES-16, both of which had relatively high wt % styrene of 68.2% and 72.5% respectively, also demonstrated relatively poor compatibility in many of the asphalts tested.

It should also be noted that the interpolymer samples ES-18, ES-13, ES-17, and ES-14, also demonstrated superior compatibility across this wide range of asphalts, when compared to both the SBS and SBR samples. SBS and SBR are both widely used commercially for the modification of asphalt, but often require the use of additional compatibilizers, such as oils, in order to achieve a storage stable blend. The data in Table 6 indicate that, in many cases, it should be possible to achieve a storage stable asphalt/interpolymer blend without the use of additional compatibilizers.

The fact that the interpolymers could be blended into the asphalt without the use of a high shear mixer is also advantageous, since this significantly reduces the capital equipment costs of a blending facility.

Strategic Highway Research Program (SHRP)Superpave Ratings

The Superpave grade ratings were determined using the following test methods:

1. Dynamic Shear Rheometer—AASHTO Method TP-5.
2. Rolling Thin Film Oven Test—AASHTO Method T-240.
3. Pressure Aging Vessel—AASHTO Method PP1.
4. Bending Beam Rheometer—AASHTO Method TP-1.
5. Brookfield Melt Viscosity—ASTM D-4402.
6. Flashpoint—AASHTO Method T-48.

The ratings for the various ethylene/styrene interpolymer—asphalt combinations are given in Table 7. High and low service temperatures in °C. are indicated with the first value a positive number and the second value a negative number; a service rating of 70–22 means a high temperature rating of 70° C. and a low service temperature of −22° C. (Temperature measurements are made in 6 deg C increments only, as prescribed in the SHRP Superpave protocol. Thus a high temperature rating of 76 would be more desirable than a rating of 70, while a low temperature rating of −28 would be more desirable than a rating of −22.

In general, the data in Table 7 show that the Superpave grade rating for the interpolymer modified asphalts was equal to or, in many cases, better than the superpave grade rating of the corresponding asphalt when modified with SBS or SBR, which represent polymers currently employed commercially. In addition, it can be seen that sample ES-15 with 68.2 wt % styrene, produced inferior superpave grade rating compared to the other interpolymer samples.

TABLE 7

| Polymer | | Superpave Rating[a] | | | | | |
|---|---|---|---|---|---|---|---|
| Designation | Percent Styrene in E/S | Canadian Murphy 120–150 | WTS Fina AC-10 | WTI DS AC-10 | Arab Hvy Marathon AC-10 | Venez Citgo AC-10 | WY Sour Conoco AC-10 |
| None* | — | 58–22 | 58–16 | 58–22 | 58–28 | 64–28 | 58–28 |
| ES-19 | 23.4 | 72–28 | 70–22 | 70–22 | 76–22 | 76–28 | 76–22 |
| ES-18 | 37 | 70–28 | 70–22 | 70–22 | 76–28 | 76–28 | 76–28 |
| ES-13 | 43 | 70–22 | 70–22 | 70–22 | 76–28 | 76–22 | 76–22 |
| ES-17 | 51 | 70–22 | 70–22 | 64–22 | 76–28 | 76–28 | 76–22 |
| ES-15 | 68.2 | 64–22 | 64–22 | 64–22 | 70–22 | 70–22 | 70–22 |
| SBR[b] | — | 70–22 | 64–28 | 64–28 | 70–28 | 70–28 | 76–28 |
| SBS[c] | — | 70–22 | 64–22 | 64–22 | 70–28 | 70–28 | 70–22 |

*Not an example of the present invention.
a High and low service temperatures in ° C. are indicated with the first value a positive number and the second value a negative number; a service rating of 70–22 means a high temperature rating of 70° C. and a low service temperature of −22° C. (Temperature measurements are made in 6° C. increments only, as prescribed in the SHRP Superpave protocol.
b A styrene butadiene rubber commercially available from Textile Rubber Co. as Ultrapave UP-70 was employed instead of an E/S interpolymer.
c A styrene butadiene styrene black copolymer commercially available from Shell Chemical as Kraton D-1101, a linear styrene-butadiene-styrene block copolymer having a styrene content of 30 wt. percent was employed instead of an E/S interpolymer.

Delta T Values for Mixtures of Asphalt and E/S Interpolymer

The delta T values were determined by defining the absolute difference between the temperature where the asphalt binder just meets the asphalt superpave high temperature grade requirement and the point where it just passes the low temperature grade requirement. These determinations were made without regard to the usual superpave protocol of using only 6° A higher delta T value is desirable, since it indicates that the asphalt binder has a broader temperature use range.

The delta T values for the various polymer—asphalt combinations are given in Table 8. With the exception of ES-15 (68.2 wt % styrene), the interpolymer samples exhibited higher delta T values in the asphalt binder blends, than the corresponding asphalts modified with the incumbent commercial polymer modifiers, SBS and SBR.

TABLE 8

| Polymer | | DELTA T VALUES; ° C. | | | | | |
|---|---|---|---|---|---|---|---|
| Designation | Percent Styrene in E/S | Canadian Murphy 120–150 | WTS Fina AC-10 | WTI DS AC-10 | Arab Hvy Marathon AC-10 | Venez Citgo AC-10 | WY Sour Conoco AC-10 |
| None* | — | 87 | 88 | 84 | 91 | 95 | 91 |
| ES-19 | 23.4 | 101 | 98 | 98 | 105 | 108 | 105 |
| ES-18 | 37 | 103 | 99 | 101 | 105 | 109 | 107 |
| ES-13 | 43 | 98 | 94 | 99 | 106 | 105 | 104 |
| ES-17 | 51 | 100 | 97 | 93 | 106 | 107 | 106 |
| ES-15 | 68.2 | 86 | 90 | 87 | 96 | 99 | 97 |
| SBR[b] | — | 95 | 96 | 93 | 101 | 104 | 112 |
| SBS[c] | — | 95 | 95 | 95 | 101 | 104 | 101 |

*Not an example of the present invention.
a High and low service temperatures in ° C. are indicated with the first value a positive number and the second value a negative number; a service rating of 70–22 means a high temperature rating of 70° C. and a low service temperature of −22° C.
b A styrene butadiene rubber commercially available from Textile Rubber Co. as Ultrapave UP-70 was employed instead of an E/S interpolymer.
c A styrene butadiene styrene block copolymer commercially available from Shell Chemical as Kraton D-1101 was employed instead of an E/S interpolymer.

The data in Tables 6, 7, and 8 clearly demonstrates that ethylene/styrene interpolymers at a polymer level of 4 percent by is weight in a mixture of asphalt and ethylene/styrene interpolymers which have a styrene content of from about 37 to about 56, in the portion of the interpolymer which contains both ethylene and styrene residues (% styrene in copolymer) have suitbility for use with a wide range of asphalt compositions.

Suitability is defined by a combination of good compatability/storage stability, in a wide range of asphalt compositions, while at the same time producing an asphalt binder with SHRP superpave grade rating, and delta T values equal to or better than those values exhibited by polymers currently in commercial use, when blended with the same asphalts.

What is claimed is:

1. A blend comprising
   (A) from about 80 to about 99 percent by weight of a bituminous material; and
   (B) from about 1 to about 20 percent by weight of
      1) at least one substantially random interpolymer comprising from about 20 to about 80 weight percent of polymer units derived from at least one vinyl or vinylidene aromatic monomer and
      2) from about 20 to about 80 weight percent of polymer units derived from at least one aliphatic olefin having from 2 to about 10 carbon atoms.

2. A blend of claim 1 wherein
   (a) component (A) is present in an amount of from about 90 to about 99 percent by weight;
   (b) component (B) is present in an amount of from about 1 to about 10 percent by weight and is an interpolymer comprising (1) from about 20 to about 80 weight percent of polymer units derived from at least one vinyl or vinylidene aromatic monomer and (2) from about 20 to about 80 weight percent of polymer units derived from at least one aliphatic olefin having from 2 to about 10 carbon atoms.

3. A blend of claim 1 wherein
   (a) component (A) is present in an amount of from about 99 to about 95 percent by weight;
   (b) component (B) is present in an amount of from about 1 to about 5 percent by weight and is an interpolymer comprising (1) from about 20 to about 80 weight percent of polymer units derived from at least one vinyl or vinylidene aromatic monomer and (2) from about 20 to about 80 weight percent of polymer units derived from at least one aliphatic olefin having from 2 to about 10 carbon atoms.

4. A blend of claim 1 wherein component (B1) is styrene and component (B2) is ethylene.

5. A blend of claim 2 wherein component (B1) is styrene and component (B2) is ethylene.

6. A blend of claim 3 wherein component (B1) is styrene and component (B2) is ethylene.

7. A blend of claim 1 wherein
   (a) component (A) is present in an amount of from about 90 to about 99 percent by weight;
   (b) component (B) is present in an amount of from about 1 to about 10 percent by weight; and
   is an interpolymer comprising (1) from about 25 to about 60 weight percent of polymer units derived from styrene and (2) from about 40 to about 75 weight percent of polymer units derived from ethylene.

8. A blend of claim 1 wherein
   (a) component (A) is present in an amount of from 95 to 99 percent by weight;
   (b) component (B) is present in an amount of from 1 to 5 percent by weight and is an interpolymer comprising (1) from about 30 to about 53 weight percent of polymer units derived from styrene and (2) from about 45 to about 70 weight percent of polymer units derived from ethylene; and
   wherein component (B) has a melt index of from 0.05 to 5.0 g/10 min determined by ASTM D-1238 procedure A, condition E (190 deg C/2.16 Kg weight).

9. A blend comprising
   (A) from about 80 to about 99 percent by weight of a bituminous material; and
   (B) from about 1 to about 20,percent by weight of at least one substantially random interpolymer comprising:

(1) from about 30 to about 79 weight percent of polymer units derived from one or more aliphatic olefins having from about 2 to about 10 carbon atoms; and
(2 from about 20 to about 69 weight percent of polymer units derived from one or more vinyl or vinylidene aromatic monomers; and
(3) from about 1 to about 20 weight percent of polymer units derived from one or more dienes; and which additionally contains (C) from about 0.1 to about 10 percent by weight based on the total amount of components (A), (B) and (C) of suffix or a sulfur-containing crosslinking material.

10. A blend of claim 9 wherein component (B1) is ethylene, component(B2) is styrene, and component (B3) is ethylidene norbornene; and component (C) is sulfur.

11. A blend of claim 9 wherein component (B) has been crosslinked by component (C).

12. A blend of claim 10 wherein component (B) has been crosslinked by component (C).

13. An aqueous dispersion or emulsion comprising
(A) from about 90 to about 99 percent by weight (based on the combined weights of A and B) of bituminous material; and
(B) from about 1 to about 10 percent by weight (based on the combined weights of A and B) of at least one substantially random interpolymer containing from about 20 to about 80 weight percent of polymer units derived from at least one vinyl or vinylidene aromatic monomer and from about 20 to about 80 weight percent of polymer units derived from at least one aliphatic olefin having from 2 to about 10 carbon atoms;
admixed with water to form an aqueous dispersion or emulsion.

* * * * *